March 21, 1950 G. C. CROWLEY 2,501,499
ELECTRIC HEATING DEVICE AND CONTROL THEREFOR
Filed Dec. 20, 1947

Inventor:
George C. Crowley,
by Alfred E. Bobst.
His Attorney.

Patented Mar. 21, 1950

2,501,499

UNITED STATES PATENT OFFICE 2,501,499

ELECTRIC HEATING DEVICE AND CONTROL THEREFOR

George Charles Crowley, Bridgeport, Conn., assignor to General Electric Company, a corporation of New York Application December 20, 1947, Serial No. 792,971

7 Claims. (Cl. 219—20)

The present invention relates to electric heating devices and controls therefor to maintain a desired temperature. More particularly, the present invention relates to electric blankets or the like, although the invention is applicable to any type of electric heating device in which the temperature of the heating winding can be used as a measure of the temperature which it is desired to maintain.

It is an object of the present invention to provide a heating device whose heating winding has a relatively high temperature coefficient of resistance and further to provide a control circuit arrangement utilizing the change in resistance of the heating winding to control the supply of electric energy to the heating winding.

It is a further object of the invention to provide a control arrangement for an electric heating device having a heating winding whose resistance changes with temperature, the said control device being adapted to control the supply of electric energy to the heating winding to maintain a desired temperature without the use of moving parts other than a simple relay, and which is self-starting and is "fail safe."

It is a still further object of the invention to provide an electric blanket and control therefor in which only a single heating winding is required in the blanket body and no moving parts other than relay are required in the control.

Figure 1:
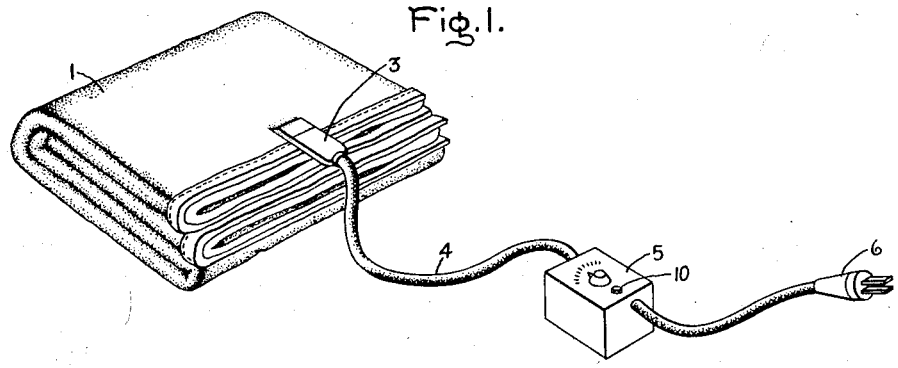
Figure 2:
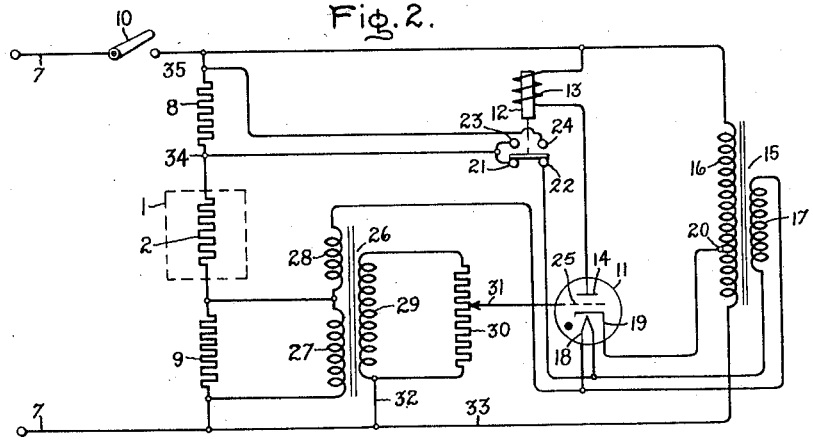
Figure 3:
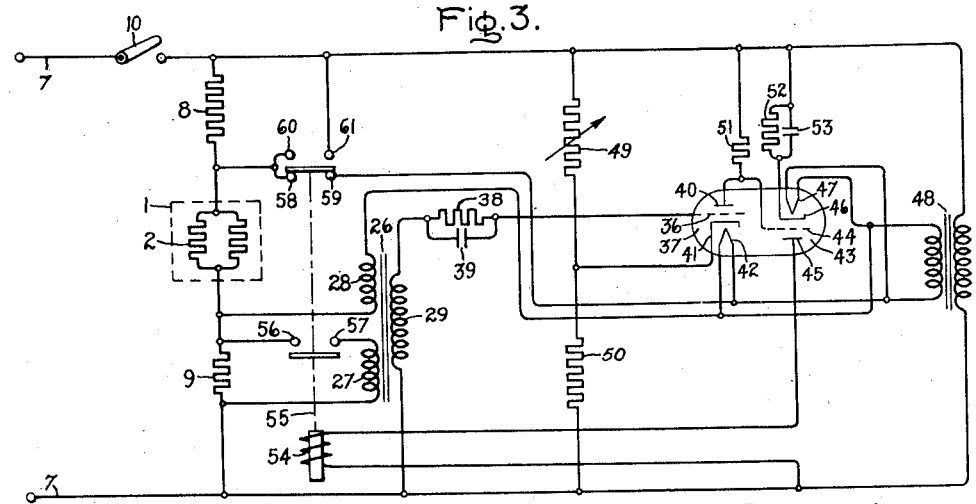

The above and other objects of the invention and the features of its construction and operation will best be understood from the following description taken in connection with the accompanying drawing in which Fig. 1 is a perspective representation of an electric blanket and control device in accordance with the present invention; Fig. 2 is a schematic circuit diagram of one modification of the invention; and Fig. 3 is a schematic circuit diagram of another modification of the invention.

The basic concept of my invention is to use the temperature of the heating winding itself as a measure of the temperature to be maintained. To this end I use a heating winding which has a high temperature coefficient of resistance, that is, a winding whose resistance changes significantly within the temperature range in which control is desired. I then employ current variations in the winding circuit occasioned by the changes of resistance of the winding due to changes in its temperature to derive control voltages. These voltages are applied to an electron tube circuit for the operation of a relay to effect the desired heating current control.

In order to make the system self-starting, I do not completely interrupt the heating winding current, but reduce the current to a very low value which will not have any appreciable heating effect. This I accomplish by causing the relay effectively to insert a current limiting device between the heating winding and the power source when the heating winding current is to be reduced after the heating winding has reached a predetermined high temperature. The small residual current then still flowing through the heating winding is likewise proportional to the heating winding resistance and, therefore, to its temperature, and is utilized through the electron tube circuit to cause the relay to operate effectively to remove the current limiting device from the heating winding circuit when the latter has cooled to a predetermined temperature.

In the specific embodiments of my invention which I have described herein, I use as a current limiting device an impedance element having a high value of impedance compared to that of the heating winding, the high impedance being effectively connected in series with the heating winding when the current through it is to be reduced. For the sake of simplicity, I prefer to connect the high impedance permanently in series with the heating winding and arrange a relay to short circuit the high impedance when its current limiting effect is not desired. It will be obvious to those skilled in the art, however, that the high impedance or other current limiting device may just as well be completely disconnected from and connected into the heating winding circuit.

The control voltages for the relay operating electron tube circuit can be derived in many ways as will be evident to those skilled in the art. The necessary condition, however, is that the control voltages be, at all times, proportional to the resistance and therefore to the temperature of the heating winding. The control voltage can therefore be derived from the current flowing through the heating winding. The voltage drop across the heating winding itself can, in many instances, conveniently be used for the derivation of a control voltage, and in the specific embodiments of my invention described herein I make use of the voltage drop across the heating winding when the current through the latter has been reduced to a small value. It happens, however, that in the specific embodiments herein described, the voltage drop across the heating winding, when full heating current is flowing through it, is inconveniently high for the control of the electron tube circuit. Therefore, while the winding current is high, I prefer in the case of these embodiments to derive the control voltage from the voltage drop across an element having a low resistance compared to the resistance of the heating winding and connected in series with it.

Referring now to the drawing, 1 indicates a blanket body containing an electric heating winding 2 connected through a plug 3 and cable 4 to an electronic control apparatus 5 and to a suitable power source through an attachment plug 6, the latter being indicated in Figs. 2 and 3 by the terminals 7. The blanket body 1 incorporating the heating winding 2 may be of any suitable construction such as, for example, the channelled construction shown in Patent No. 2,203,918 to I. O. Moberg, issued June 11, 1940. The heating winding 2 is preferably uniformly distributed over the blanket area and may consist of a single winding, as illustrated in Fig. 2, or of two or more independent windings connected in parallel, as illustrated in Fig. 3.

In any case the blanket heating winding 2 is made of a conductor which has a high temperature coefficient of resistance within the desired working range. The temperature coefficient of resistance of the heating winding may be either positive or negative. I prefer, however, to use copper which is an inexpensive and readily available material. Copper has a positive temperature coefficient of resistance, that is, its resistance increases with increase in temperature. Since my invention depends upon the change in current flowing through the heating winding with change in temperature, it is necessary in the event that a material having a negative temperature coefficient of resistance is used, to reverse the operation of the circuit in response to an increase or a decrease in the heating winding current, as will be evident to those skilled in the art.

Referring now specifically to Fig. 2, the blanket heating winding 2 is connected, in series with a high resistance 8 and a low resistance 9, to a source of power 7 through a control switch 10; for example, with a blanket heating winding resistance of 67 ohms, the resistance 8 may have a value of 1500 ohms and the resistance 9 of a value of 3 ohms. These figures are given by way of example only, and it will be understood by those skilled in the art that these values may be varied widely, depending upon the parameters of the heating wire and of the other elements in the circuit.

Also connected across the power source is a gaseous discharge tube such as the thyratron 11 having its plate circuit in series with the coil 13 of a single pole, double throw relay 12. In addition to the anode 14, the thyratron 11 has a control grid 25, a cathode 19 and a heater 18. The thyratron 11 may be energized in any suitable manner. In the circuit illustrated, the anode 14 is connected to one side of the relay coil 13, the other side of which is connected to one of the line terminals. A transformer 15 having primary winding 16 and secondary winding 17 is used to energize the heater 18 of the thyratron. To this end the primary 16 is connected across the line terminals and the secondary 17 is connected to the terminals of heater 18. Cathode 19 of the thyratron is connected to a tap 20 on the transformer primary 16.

The thyratron 11 thus controls the energization of relay coil 13. When the relay is deenergized, its lower contacts 21, 22 are closed. When the relay is energized, by current flowing through tube 11, the upper relay contacts 23, 24 are closed.

The energization of the grid 25 of the thyratron 11 is dependent upon the current flowing through the blanket winding 2. For this purpose, there is provided a transformer 26 having two primary windings 27, 28 wound in opposite directions and a secondary winding 29. Primary winding 27 is connected across low resistance 9. One end of primary winding 28 is connected to the common terminal of primary 27, resistor 9 and blanket heating winding 2. The other end of primary 28 is connected to one side of secondary 17 of the filament transformer 15. The other side of this secondary 17 is connected to relay contact 22. The secondary winding 29 supplies current to a potentiometer resistance 30 having a movable contact arm 31 which is connected to the grid 25. To complete the grid circuit, one end of potentiometer 30 is connected to the cathode 19 of tube 11 by way of conductors 32, 33 and a portion of primary 16 of transformer 15. Finally, the resistance 8, which is also in series with the blanket winding 2, has its common terminal 34 connected to relay contacts 21 and 23, the other terminal 35 of the resistance 8 being connected to relay contact 24.

The operation of the circuit is as follows: Assuming the heating winding 2 to be cold, closing of the switch 10 allows current to flow through the series circuit including resistance 8, heating winding 2, and resistor 9, producing a sufficiently positive potential on the grid 25 of thyratron 11 to cause current to flow through the thyratron, thereby energizing relay coil 13. The relay closes contacts 23, 24 which results in the short-circuiting of high resistance 8 and permits full current to flow through the blanket heating winding 2 and resistance 9. Under these conditions, it will be apparent that the potential of control grid 25 is determined by the voltage drop across resistor 9 due to the blanket current. This voltage drop energizes primary 27 of transformer 26 and produces a voltage in the secondary 29, which voltage in turn appears across potentiometer 30. A portion of this voltage is taken off by way of contact 31 and directly appears on the grid 25.

As the blanket winding heats up, its resistance increases, resulting in a decrease in the current through resistor 9 and a corresponding decrease in the grid voltage of tube 11. The circuit is so adjusted that when the blanket heating winding 2 reaches a predetermined temperature, the voltage on grid 25 is insufficient to maintain conduction through the thyratron 11, so that its plate current is cut off and relay coil 13 becomes deenergized. The short-circuit on resistance 8 is then removed by the opening of contacts 23, 24. At the same time, contacts 21, 22 are closed, so that secondary winding 28 is now connected across heating winding 2 and the secondary of 15. The voltage induced in secondary winding 29 and available for the control of grid 25 is, therefore, the difference of the voltage drop across the blanket and the output of the secondary of 15. It will be observed that when the relay 12 is deenergized, current through the blanket winding 2 is reduced to a very low value since it is now connected in series with high resistance 8. Since the current is likewise reduced through resistance 9, which it will be remembered has a very low value, only a very small voltage is available to energize primary 27. Primary 28, however, being connected across the higher blanket heating winding resistance produces a larger voltage in the secondary 29 and it is substantially this voltage, which is now effective to control the thyratron 11. However, this voltage drop is opposed by the higher and out-of-phase voltage of the secondary of 15. As the voltage drop across 2 decreases the voltage appearing across primary 28 increases. Primary 28 is wound opposite to 27 so that the voltage across 29 will be of the correct phase.

As the heating winding 2 cools, its resistance decreases, resulting in a decrease in the voltage drop across it. The circuit constants are so chosen that when the heating winding cools to a predetermined low value, a sufficient voltage will appear on the grid 25 to cause tube 11 again to become conductive, whereupon relay coil 13 again is energized and the heating cycle is repeated. A desired average blanket temperature is thereby maintained.

A modified control circuit is shown in Fig. 3. This operates in substantially the same manner as the circuit of Fig. 2, but uses a pair of high vacuum tubes, which may be in a single envelope, and a double pole, double throw relay. Similar elements in the modification of Fig. 3 have been given the same reference numerals as corresponding elements of Fig. 2. Thus the blanket heating winding 2 is similarly connected across the line in series with a high resistance 8 and a low resistance 9. Also, transformer 26 has two primary windings 27 and 28 and a secondary winding 29. Secondary 29 is, however, directly connected to the grid 36 of a first vacuum tube 37 through a grid leak 38 and a condenser 39. Vacuum tube 37 also has an anode 40, cathode 41, and heater 42. A second vacuum tube 43 has control grid 44, anode 45, cathode 46 and heater 47. The heaters 42 and 47 of both tubes are energized from transformer 48.

As previously mentioned, the grid 36 is connected to transformer secondary 29. In order to compensate for line voltage changes, a bridge network is formed by two series connected resistors 49 and 50, one of which, for example 49, is made adjustable. Cathode 41 is connected to the junction of these two resistors and the grid cathode circuit is thus completed from the lower end of transformer secondary 29 through resistor 50 to the cathode 41.

The anode circuit of tube 37 includes load resistor 51, which is connected across the grid 44 and cathode 46 of tube 43 through a grid leak 52 and condenser 53. The anode 45 of tube 43 is connected in series with relay coil 54 of a double pole, double throw relay 55 having contacts 56, 57 connected between transformer primary 27 and low resistance 9. When these contacts are closed, primary 27 is connected across resistance 9 and when the contacts are open, primary 27 is deenergized. The relay 55 also has contacts 58, 59 connected in series with the secondary of transformer 48 and primary winding 28 of transformer 29 across the blanket heating winding 2. When contacts 58, 59 are open, primary 28 is deenergized. Relay 55 also has contacts 60, 61 connected in a circuit across high resistance 8 so that when these contacts are closed, resistance 8 is short circuited. In the deenergized position of relay 55, which is the position shown in the drawing, primary 27 is deenergized and primary 28 is connected in series with the secondary of 48.

The operation of the circuit is as follows: With the heating winding 2 cold, if the switch 10 be closed, a sufficient voltage appears on grid 36 to make tube 37 conductive and thereby to energize grid 44 causing tube 43 also to become conductive, thereby energizing relay coil 54. Contacts 58, 59 are then opened and contacts 60, 61 closed, short-circuiting high resistance 8, whereby heating winding 2 is supplied with full current. Simultaneously, contacts 56, 57 are closed, placing primary 27 across low resistance 9. The voltage drop which then appears across resistance 9, produces a voltage across secondary 29 for the energization of grid 36. So long as heating winding 2 is below a predetermined temperature, the grid voltage is sufficient to permit current flow through both tubes 37 and 43 which maintains relay coil 54 energized.

When, however, blanket heating winding 2 reaches a predetermined high temperature, its resistance will have increased and the current through it and through resistor 9 will have decreased to the point where the voltage induced in secondary 29 and appearing on the grid 36 is reduced to such a value that the plate current through tube 43 is no longer able to maintain energization of relay coil 54. The relay, therefore, becomes deenergized, opening contacts 60, 61 and removing the short circuit around resistance 8. Simultaneously, primary 27 is disconnected by the opening of contacts 56, 57, and primary 28, by the closing of contacts 58, 59, is connected in series with the secondary of 48 across heating winding 2. The voltage drop across 2 is now opposed by the voltage across the secondary of 48 with the latter voltage being approximately twice that of the voltage drop across 2. The difference in voltage is then impressed across primary 28 which is wound opposite to that of 27 so that the phase of the voltage across 29 will be correct. As the voltage drop across 2 decreases the voltage across 28 and 29 increases. With the insertion of high resistance 8 in series with heating winding 2, current through the heating winding is reduced to a relatively low value, permitting the heating winding to cool.

When heating winding 2 has reached a predetermined low temperature, its resistance will have decreased and the current through it increased sufficiently so that the voltage drop appearing across primary 28 induces a voltage in secondary 29 sufficient to cause grid 36 to make tube 37 conductive, which in turn makes tube 43 conductive and reenergizes relay coil 54. The heating cycle is thereby repeated.

The circuit of Fig. 3 is preferable where the use of a gas filled thyratron is undesirable. Also, the Fig. 3 circuit is somewhat more sensitive. It is for the latter reason that I have shown a double pole relay which opens transformer primary circuit 27. Thus, while the blanket is cooling, the electronic circuit is controlled entirely by the voltage drop across the blanket, eliminating even the small effect of the voltage drop across low resistance 9. If the higher sensitivity is not required, the second pole of the relay may be omitted, as in Fig. 2. Conversely, a double pole relay may be used in the circuit of Fig. 2, if desired.

It will be understood that the operation of the circuits so far described is entirely dependent upon the temperature of the heating wire itself. In many cases, satisfactory temperature regulation can thus be obtained. However, when the arrangement is to be used to control the temperature of an electrically heated bed covering, as well as in certain other applications, I prefer to introduce ambient temperature compensation into the control. Such ambient temperature compensation can be introduced into the control circuits at various points and with various devices known per se.

As an example, a simple and effective arrangement will be obtained by making the resistor 50 in Figure 3 of a material having a pronounced temperature coefficient of resistance, for example, nickel, copper, or the like. The resistor 50 is then physically mounted in the control so that it will be thermally removed from the blanket and other local heating influences and will be subjected substantially solely to the ambient temperature of the room in which the heating device 1 is being used. In the case of an electrically heated bed cover as represented in Fig. 1, the temperature responsive resistor 50 may conveniently be mounted in a portion of the control box 5 making suitable provision to insulate the resistor thermally from the heat produced by the vacuum tubes and to provide for free circulation of air around the resistor.

The operation of the circuit will then be the same as previously described. However, as the ambient temperature increases, the resistor 50 will increase its resistance. Consequently the potential drop across it will be greater and the potential of the cathode 41 of the tube 37 will be closer to the grid potential of that tube. The tube, therefore, will produce an earlier decrease in its plate current to open relay 55 at a lower temperature than would otherwise have been the case. Conversely, as the ambient temperature decreases, the circuit will permit the heating winding 2 to reach a higher temperature before the relay 55 opens.

While I have described my invention with reference to a control for an electric blanket, to which my control circuit is particularly applicable, it will be understood by those skilled in the art that my control circuit can also be applied to any type of heating device in which the temperature of the heating winding is a satisfactory measure of the degree of heat desired.

What I claim as new and desire to secure by Letters Patent in the United States is:

1. A control for an electric heating device having a heating winding with a large temperature coefficient of resistance, comprising in combination therewith a first resistance element having a high resistance compared to the resistance of said winding and a second resistance element having a low resistance compared to the resistance of said winding, both being connected in a series circuit with said heating winding across a power source, relay means having contacts connected across said first resistance element for short-circuiting the same and electronic circuit means for controlling the energization and deenergization of said relay means in response to changes in the temperature of said winding, said electronic circuit including a control grid, means for deriving a first control voltage from the voltage drop across said low resistance, means for deriving a second control voltage from the voltage drop across said heating winding and means for alternately applying said control voltages to said control grid.

2. A control for an electric heating device having a heating winding with a large temperature coefficient of resistance, comprising in combination therewith a high resistance element having a high resistance compared to the resistance of said winding and a low resistance element having a low resistance compared to the resistance of said winding both being connected in a series circuit with said heating winding across a power source, a double throw relay having contacts connected with said high resistance for short-circuiting the same when the relay is energized and other contacts connected with said heating winding, an electron tube circuit for controlling the energization and deenergization of said relay in response to resistance changes of said heating winding, said circuit including a control grid, and means including said other contacts for applying to said grid when said relay is deenergized a control voltage derived from the voltage drop across said heating winding, and when said relay is energized a control voltage derived from the voltage drop across said low resistance.

3. In combination, an electric heating winding with a large temperature coefficient of resistance, a high resistance element having a resistance which is large compared to the resistance of said winding connected in series with said winding, a low resistance element having a resistance which is small compared to the resistance of said winding also connected in series with said winding, a transformer having two primary windings and a cooperating secondary winding, one of said primary windings being connected in a circuit across said low resistance element and the other of said primary windings being connected in a circuit with said heating winding, electron tube circuit means having input and output circuits, means connecting said input circuit with said secondary winding, a relay, means connecting said output circuit with said relay for the energization of the same, said relay having first and second contacts, said first contacts being connected across said high resistance and being adapted to short-circuit the same when the relay is energized and to remove such short-circuit when the relay is deenergized, said second contacts being connected in circuit with said other primary winding and said heating winding and being adapted to open said other primary winding circuit when the relay is energized and to close the same when the relay is deenergized.

4. In combination, an electric heating winding with a large temperature coefficient of resistance, a high resistance element having a resistance which is large compared to the resistance of said winding connected in series with said winding, a low resistance element having a resistance which is small compared to the resistance of said winding also connected in series with said winding, a transformer having two primary windings and a cooperating secondary winding, one of said primary windings being connected in a circuit across said low resistance element and the other of said primary windings being connected in a circuit with said heating winding, electron tube circuit means having input and output circuits, means connecting said input circuit with said secondary winding, a relay, means connecting said output circuit with said relay for the energization of the same, said relay having first and second contacts, said first contacts being connected across said high resistance and being adapted to short-circuit the same when the relay is energized and to remove such short-circuit when the relay is deenergized, said second contacts being connected in circuit with said other primary winding and said heating winding and being adapted to open said other primary winding circuit when the relay is energized and to close the same when the relay is deenergized and adjustable means in said electron tube circuit for varying the output current thereof.

5. In combination, an electric heating winding with a large temperature coefficient of resistance, a high resistance element having a resistance which is large compared to the resistance of said winding connected in series with said winding, a low resistance element having a resistance which is small compared to the resistance of said winding also connected in series with said winding, a transformer having two primary windings and a cooperating secondary winding, one of said primary windings being connected in a circuit across said low resistance element and the other of said primary windings being connected in a circuit with said heating winding, a gaseous discharge tube having grid and anode circuits, said grid circuit being connected to said secondary winding to provide control potentials for said tube, a double throw relay having first and second contacts and having an energizing coil connected in said anode circuit, said first contacts being connected across said high resistance and adapted to short-circuit the same when the relay is energized and to remove such short-circuit when the relay is deenergized, said second contacts being connected in circuit with said other primary winding and said heating winding and being adapted to open said other primary winding circuit when the relay is energized and to close the same when the relay is deenergized.

6. In combination, an electric heating winding with a large temperature coefficient of resistance, a high resistance element having a resistance which is large compared to the resistance of said winding connected in series with said winding, a low resistance element having a resistance which is small compared to the resistance of said winding also connected in series with said winding, a transformer having two primary windings and a cooperating secondary winding, one of said primary windings being connected in a circuit across said low resistance element and the other of said primary windings being connected in a circuit with said heating winding, an adjustable potentiometer resistance connected across said secondary winding, a gaseous discharge tube having grid and anode circuits, said grid circuit being connected to said potentiometer resistance to provide control potentials for said tube, a double throw relay having first and second contacts and having an energizing coil connected in said anode circuit, said first contacts being connected across said high resistance and adapted to short-circuit the same when the relay is energized and to remove such short-circuit when the relay is deenergized, said second contacts being connected in circuit with said other primary winding and said heating winding and being adapted to open said other primary winding circuit when the relay is energized and to close the same when the relay is deenergized.

7. In combination, an electric heating winding with a large temperature coefficient of resistance, a high resistance element having a resistance which is large compared to the resistance of said winding connected in series with said winding, a low resistance element having a resistance which is small compared to the resistance of said winding also connected in series with said winding, a transformer having two primary windings and a cooperating secondary winding, one of said primary windings being connected in a circuit across said low resistance element and the other of said primary windings being connected in a circuit with said heating winding, a vacuum tube circuit having an input control grid and an output circuit, means connecting said control grid to said transformer secondary, a double throw relay having first, second and third contact groups and having an energizing coil connected in said anode circuit, said first contact group being connected across high resistance and adapted to short-circuit the same when the relay is energized and to remove such short-circuit when the relay is deenergized, said second contact group being connected in circuit with said other primary winding and said heating winding and being adapted to open said other primary winding circuit when the relay is energized and to close the same when the relay is deenergized, said third contact group being connected in circuit with said one primary winding and said low resistance and being adapted to close said one primary winding circuit when the relay is energized and to open the same when the relay is deenergized.

GEORGE CHARLES CROWLEY.

REFERENCES CITED

The following references are of record in the file of this patent:

UNITED STATES PATENTS

| Number | Name | Date |
| --- | --- | --- |
| 915,974 | Leonard | Mar. 23, 1909 |
| 1,566,980 | Seede | Dec. 22, 1925 |
| 1,694,264 | Hull | Dec. 4, 1928 |
| 2,455,379 | McLennan | Dec. 7, 1948 |

FOREIGN PATENTS

| Number | Country | Date |
| --- | --- | --- |
| 144,669 | Great Britain | Sept. 9, 1921 |
| 623,503 | Germany | Dec. 24, 1935 |